(12) United States Patent
Suzuki et al.

(10) Patent No.: US 6,491,829 B2
(45) Date of Patent: Dec. 10, 2002

(54) METHOD AND UNIT FOR PROCESSING CONTAMINATED LIQUID

(75) Inventors: Akira Suzuki, Tokyo (JP); Takashi Nishimoto, Room 902, Charme-Ebara 1-17-5 Ebara, Shinagawa-ku, Tokyo 142-0063 (JP)

(73) Assignee: Takashi Nishimoto, Tokyo (JP)

( * ) Notice: Subject to any disclaimer, the term of this patent is extended or adjusted under 35 U.S.C. 154(b) by 0 days.

(21) Appl. No.: 09/733,350

(22) Filed: Dec. 8, 2000

(65) Prior Publication Data

US 2001/0007313 A1 Jul. 12, 2001

(30) Foreign Application Priority Data

Dec. 24, 1999 (JP) .............................. 11-376938
Nov. 1, 2000 (JP) ......................... 2000-334436

(51) Int. Cl.⁷ ............................. B01D 17/00; B01F 7/16
(52) U.S. Cl. ..................... 210/749; 210/766; 210/787; 210/178; 210/205; 210/219; 210/512.3; 366/316
(58) Field of Search ................................. 210/749, 766, 210/787, 178, 179, 198.1, 205, 219, 263, 407, 512.3, 909; 366/144, 316

(56) References Cited

U.S. PATENT DOCUMENTS

| | | | |
|---|---|---|---|
| 2,382,605 A | * | 8/1945 | Carter, Jr. |
| 3,351,434 A | * | 11/1967 | Grimes et al. |
| 4,344,842 A | * | 8/1982 | Fox |
| 4,933,086 A | * | 6/1990 | McMahon et al. |
| 4,985,149 A | * | 1/1991 | Ohshima et al. |
| 5,401,423 A | * | 3/1995 | Leung et al. |
| 5,453,202 A | * | 9/1995 | Marchesi |
| 5,746,789 A | * | 5/1998 | Wright et al. |

* cited by examiner

*Primary Examiner*—Fred Prince
(74) *Attorney, Agent, or Firm*—Gibbons, Del Deo, Dolan, Griffinger & Vecchione

(57) ABSTRACT

For conversion of harmful compound in contaminated liquid into harmless compound by use of reactant, a plurality of agitators are arranged in a vertical superposition within a closed agitation chamber and, after the contaminated liquid is charged into the agitation chamber, the agitators are driven for rotation at a high speed in a rage from 10,000 to 18,000 rpm in order to create a field of super critical conditions in which free radicals are liberated from the harmful compound and coupled by the reactant. Neither high temperature heating nor high level pressurization is needed for processing of the contaminated liquid.

15 Claims, 10 Drawing Sheets

METHOD AND UNIT FOR PROCESSING CONTAMINATED LIQUID

BACKGROUND OF THE INVENTION

The present invention relates to method and unit for processing a contaminated liquid, and more particularly relates to formation of a field of super critical conditions within an agitation chamber containing a liquid contaminated with a harmful compound or compounds such as polychlorinated biphenyl (PCB) unsuited for any chemical reactions under normal conditions for the purpose of liberation and removal of such a compound or compounds.

In this specification, the term "a harmful compound" refers to a compound which poses malign influences, in any forms, on healthy human life and is unsuited for any chemical reactions under normal conditions.

Further, the term "perforated" encompasses a substantially planar construction which is provided with one or more holes opening in both surfaces of an agitator and/or one or more recesses formed in at least one of both surfaces of an agitator.

Conventionally, the following expedients have been generally employed in order to convert a harmful compound, which is unsuited for chemical reactions by use of reactants under normal conditions, into a harmless compound via reactions.

One of such expedients is called "separation of super critical water by oxidation". Here the term "super critical water" refers to a kind of water placed under a condition in which the temperature is 374° C. or higher and the pressure exceeds 22 MPa. Such a water has a property to move actively just like gases to separate a target, i.e. a harmful compound. In practice it is required that the temperature is about 600° C. and the pressure is about 22 MPa.

Another of such expedients is called "separation by alkali catalyst". In the case of this process, hydrogen provider, carbon type catalyst and alkali such as potassium hydroxide are added to a harmful compound, and the mixture is heated at a temperature in a range from 300 to 350° C. under presence of nitrogen in order to eliminate a part of the harmful compound, for example chlorine in the case of PCB.

In the case of such conventional expedients, however, it is necessary to carry out the process within a closed environment under high temperature and high-pressure conditions and/or under presence of nitrogen gas. This entails use of a reaction device well resistant to corrosions by high temperature, high pressure and reaction gas. In addition, high level of process control and maintenance of the device are required. For these reasons, the conventional expedients are suited for only batch-type processing but not for continuous processing. Consequently, all of the conventional expedients were not feasible in practice from the viewpoint of economic efficiency.

SUMMARY OF THE INVENTION

It is thus the primary object of the present invention to enable rapid conversion of a harmful compound into a harmless compound such as dechlorination of PCB under normal temperatures and normal pressures in a continuous mode.

In accordance with one aspect of the present invention, an agitation chamber is provided which incorporates two or more horizontal perforated agitators arranged in a vertically spaced superposed positions, a mixed solution of contaminated liquid containing harmful compounds and reactant capable of coupling to free radicals from the compounds is prepared, the mixed solution is charged into the agitation chamber, the agitators are driven for rotation at a speed in a range from 10,000 to 18,000 rpm, and a processed solution is discharged from the agitation chamber.

In accordance with another aspect of the present invention, a vertical-type agitation chamber is formed in a substantially closed construction, two or more horizontal perforated agitators are incorporated in the agitation chamber in a vertically spaced superposed arrangement, means are provided for charging into the agitation chamber a mixed solution of a contaminated liquid containing harmful compounds and a reactant capable of coupling to free radicals from the compounds, means are provided for driving the agitators for rotation at a speed in a range from 10,000 to 18,000 rpm, and means are provided for discharging a processed solution from the agitation chamber.

The agitator may take the form of either a circular disc or a branched disc.

In the system of the present invention of the above-described aspects, high-speed rotation of the agitators causes intense and dynamic frictional contact of the mixed solution with the surfaces of the agitators. This frictional contact generates heat of high temperature (from 230 to 300° C.). In addition, centrifugal force caused by the frictional contact strongly compresses the mixed solution within the holes and/or recesses in the agitators and the mixed solution in the region near the side wall of the agitation chamber, thereby creating a high pressure condition of 22 MPa or higher. Further, due to Bernoulli effect, high speed rotation of the agitators causes a large pressure drop in the mixed solution and such pressure drop causes generation of lots of fine bubbles via cavitation. These fine bubbles are destroyed by shearing force created by the high-speed rotation of the agitators.

Combination of the high temperature with the high pressure creates a field of super critical conditions within the agitation chamber. Such conditions induce a radical reaction by which a part of the contaminated liquid is liberated in the form of free radicals. In addition, destruction of the fine bubbles generates super sonic which promotes the above-described radical reaction.

DESCRIPTION OF THE PREFERRED EMBODIMENTS

Figure 1:
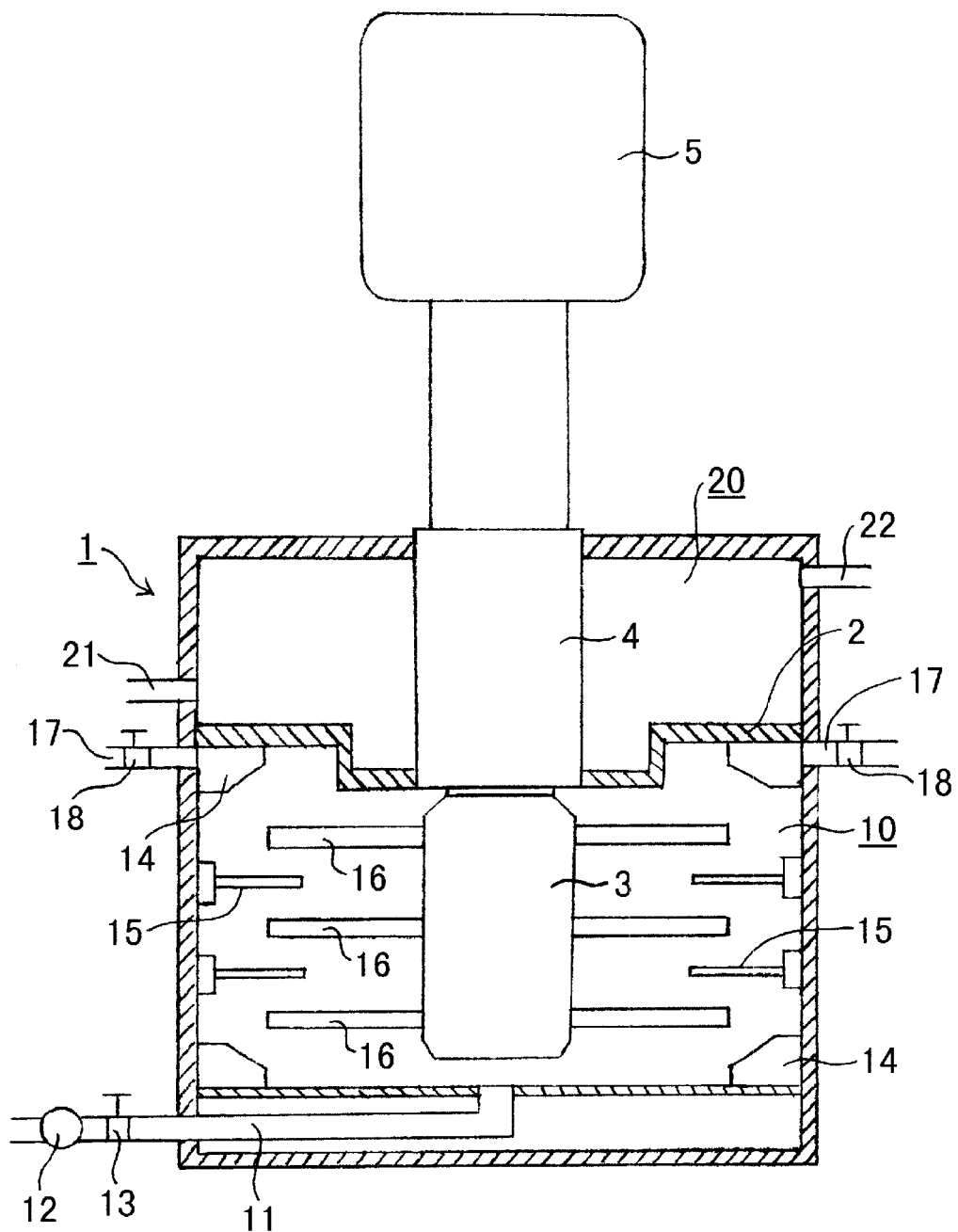
FIG. 1 is a sectional side view of one embodiment of the unit for processing a contaminated liquid in accordance with the present invention.
Figure 2:
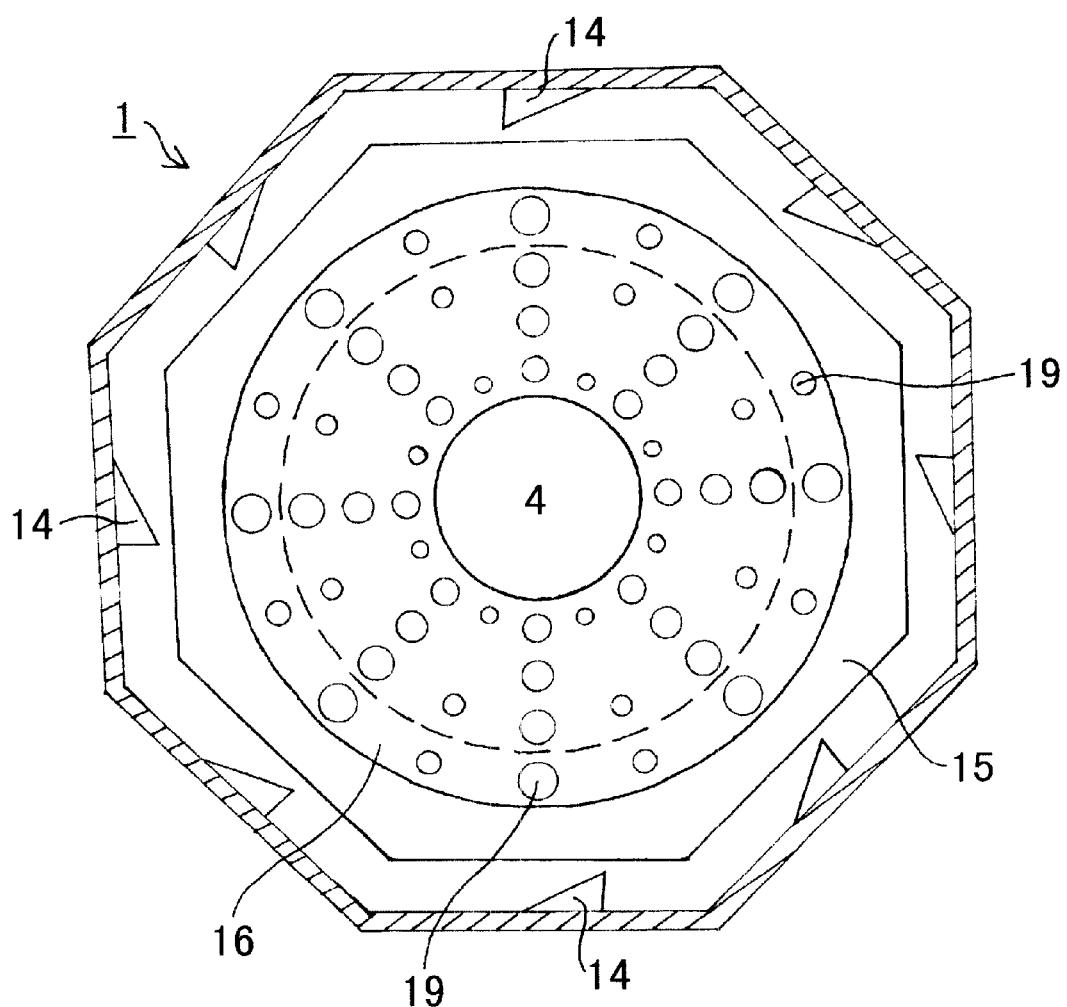
FIG. 2 is a sectional plan view of the unit shown in FIG. 1.

One embodiment of the unit for processing a contaminated liquid in accordance with the present invention is shown in FIGS. 1 and 2, in which circular discs are used for the agitators.

The unit includes a processing unit 1 of a substantially closed construction and of an octagonal cross-sectional profile. Connections to later described conduits and partition are all sealed properly in a known manner. The interior of the processing unit 1 is divided into an upper cooling chamber 20 and a lower agitation chamber 10 by a horizontal partition 2.

The cooling chamber 20 is used for suppressing rise in temperature within the agitation chamber 10 to be caused by the radical reaction. To this end, the cooling chamber 20 is associated with supply and exhaust conduits 21, 22 and the supply conduit 21 is connected to a proper supply source of cooling water not shown. A proper cooling device may be provided between the supply and exhaust conduits 21, 22 for constant circulation of the cooling water.

A rotary shaft 3 extends vertically thorough the center of the agitation chamber 10 in connection to an outside drive motor 5 via a bearing case 4 arranged in the cooling chamber 20. The drive motor 5 is properly mounted atop the processing unit 1. The drive motor 5 is designed to drive the rotary shaft 3 for rotation at a speed from 10,000 to 18,000 rpm.

Three sets of circular discs 16 are horizontally and concentrically secured to the rotary shaft 3 in a vertically spaced superposed arrangement. Each circular disc 16 is provided with one or more vertical through holes or one or more recesses 19 formed in at least one surface thereof. In the following description, however, it is assumed that the through holes are formed in the circular disc 16. The superposed circular discs 16 may be different in diameter.

A supply conduit 11 of the mixed solution opens in the agitation chamber 10 near the bottom end thereof. The supply conduit 11 is connected, via a pump 12 and a control valve 13 to a supply source (not shown) of the mixed solution. The supply source contains the contaminated liquid containing a harmful compound and a reactant capable of coupling to free radicals to be liberated from the compound. As an alternative, the supply source may be accompanied with a separate reservoir for such a reactant.

An exhaust conduit 17 associated with a control valve 18 opens in the agitation chamber 10 near the top end thereof. A plurality of supply and exhaust conduits 11, 17 may be connected to the agitation chamber 10.

A plurality of baffle pieces 14 are secured to the side wall of the agitation chamber 10 with circumferential distribution near the top and bottom ends of the agitation chamber 10. As best seen in FIG. 2, each baffle pieces 14 is triangular in shape and projects toward the center of the agitation chamber 10.

At positions between adjacent circular discs 16, deflector rings 15 are secured to the sidewall of the agitation chamber 10. As shown in FIG. 2, the inner edge of each deflector ring 15 extends toward the center of the agitation chamber 10 beyond the outer edge of the associated circular discs 16.

In operation, the mixed solution is charged into the agitation chamber 10 via the supply conduit 11. As the circular discs 16 are driven for high speed rotation, the mixed solution first tends to flow upwards from the bottom region in the chamber while convoluting about the center of the agitation chamber 10. The upward flow of the mixed solution is, however, hampered by the lowest deflector ring 15 and directed inwards along the surface of the lowest circular disc 16. This deflection of flow results in increased dynamic contact between the mixed solution and the adjacent circular discs 16.

Next, the mixed solution changes its flow direction outwards due to centrifugal force generated by the high-speed rotation of the circular discs 16. On collision against the sidewall of the chamber, the mixed solution again tends to flow upwards. This upward flow is hampered by the next deflector ring 15 and the mixed solution again flows towards the center of the chamber.

While repeating this process, the mixed solution gradually flows upwards within the agitation chamber 10 while convoluting. During this process, the convoluting mixed solution is directed towards the center of the chamber by the baffle pieces 14 to further increase its dynamic contact with the circular discs 16.

When the agitation chamber 10 is provided with neither the baffle pieces nor the deflector rings, the mixed solution charged into the agitation chamber 10 would flow directly upwards while convoluting along the side wall of the chamber due to the centrifugal force, thereby reducing dynamic contact with the circular discs 16. The baffle pieces 14 and the deflector rigs 15 are used to avoid such an undesirable situation.

As the circular discs 16 rotate at a high speed under increased dynamic contact with the mixed solution, dynamic friction between the mixed solution and the circular discs generates heat of high temperature from 230 to 300° C. or higher. Concurrently with this process, the centrifugal force generated by the high-speed rotation of the circular discs strongly compresses the mixed solution against the sidewall of the agitation chamber 10, thereby resulting in significant rise in pressure of the mixed solution (higher than 22 Mpa). Such rise in pressure occurs also in the holes 19 in the circular discs 16. That is, the mixed solution within each hole 19 is strongly compressed against the sidewall of the hole 19 remote from the center of the chamber. In addition, the pressure of the mixed solution drops greatly due to Bernoulli effect following the high-speed rotation of the circular discs 16 and lots of fine bubbles arm generated via cavitation. These bubbles are destroyed by the shearing force generated by the high-speed rotation of the circular discs 16 to generate super sonic speed which promotes rise in pressure of the mixed solution.

Due to the combined effect of the high temperature caused by frictional heat and the high pressure caused by centrifugal force, a field of super critical conditions is created within the agitation chamber 10 and the radical reaction occurs to liberate a part of the harmful compounds contained in the contaminated liquid in the form of free radicals. The free radicals are coupled to the reactant to convert the harmful compounds into harmless compounds. Destruction of the fine bubbles generates super sonic speed which well promotes the above-described radical reaction.

Thus, processing of the mixed solution is completed and processed solution flows upwards near the top end of the agitation chamber 10 while convoluting so as to be discharged outside the processing unit 1 via the exhaust conduit 17.

One example of the design of the processing unit is shown in Table 1.

TABLE 1

Specification of a processing unit

| | |
|---|---|
| capacity of agitation chamber | 20 liters |
| diameter of circular disc | 280 mm |
| thickness of circular disc | 8 mm |
| number of circular disc | 4 |
| gap between discs | 25 mm |
| diameter of hole | 10~20 mm |
| number of hole | 56 |
| surface percentage of holes | 24% |
| arrangment of holes | 12 radical directions |
| center angle | 30 degrees |

The system of this invention is applicable to processing of contaminated liquids containing various harmful compounds. Most typically, the system is well suited for processing of a contaminated liquid containing PCB (polychlorinated biphenyl). In this case, a solid sodium is used for the reactant. As stated above, the radical reaction liberates chlorine in PCB as free radicals which reacts with sodium to produce sodium chloride. That is, harmful PCB is converted into harmless sodium chloride. Thus, the processed solution contains biphenyl and sodium chloride can be discharged outside the system without any detriment to healthy human life.

The system of the present invention is additionally applicable to processing of industrial wastes such as liquid isolation oils for capacitors and exhaust oils. In the case of contaminated soils, proper liquidation is employed for processing by the system of the present invention.

Figure 3:
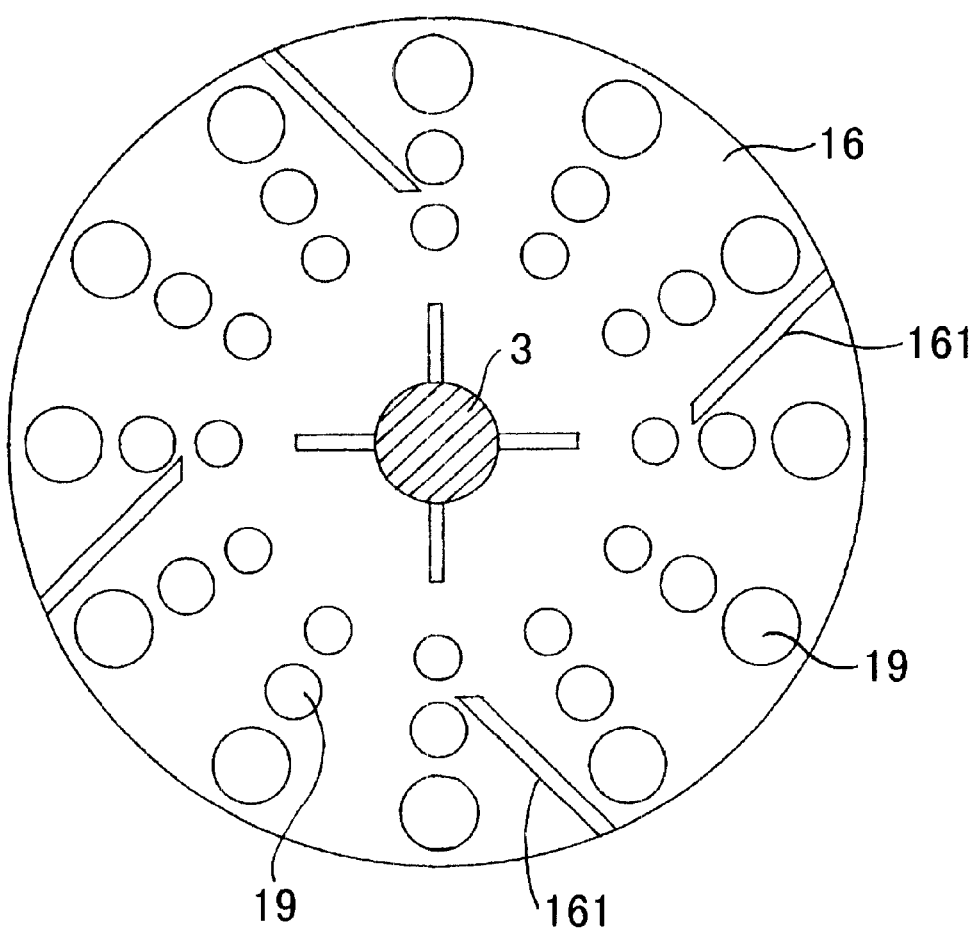
FIG. 3 is a plan view of one embodiment of the agitator used for the unit shown in FIGS. 1 and 2.

Another embodiment of the circular disc usable for the processing unit of the present invention is shown in FIG. 3, in which a circular disc 16 is provided with a plurality of vanes 161 secured onto at least one of its upper and lower surfaces near the outer edge. Each vane 161 is arranged with some bias with respect to the radial direction of the disc. As the circular discs 16 rotate at a high speed, the vanes 161 force the mixed solution near the surface or surfaces of the disc to flow radially outwards to enhance the centrifugal effect and the shearing effect on the fine bubbles.

Figure 4:
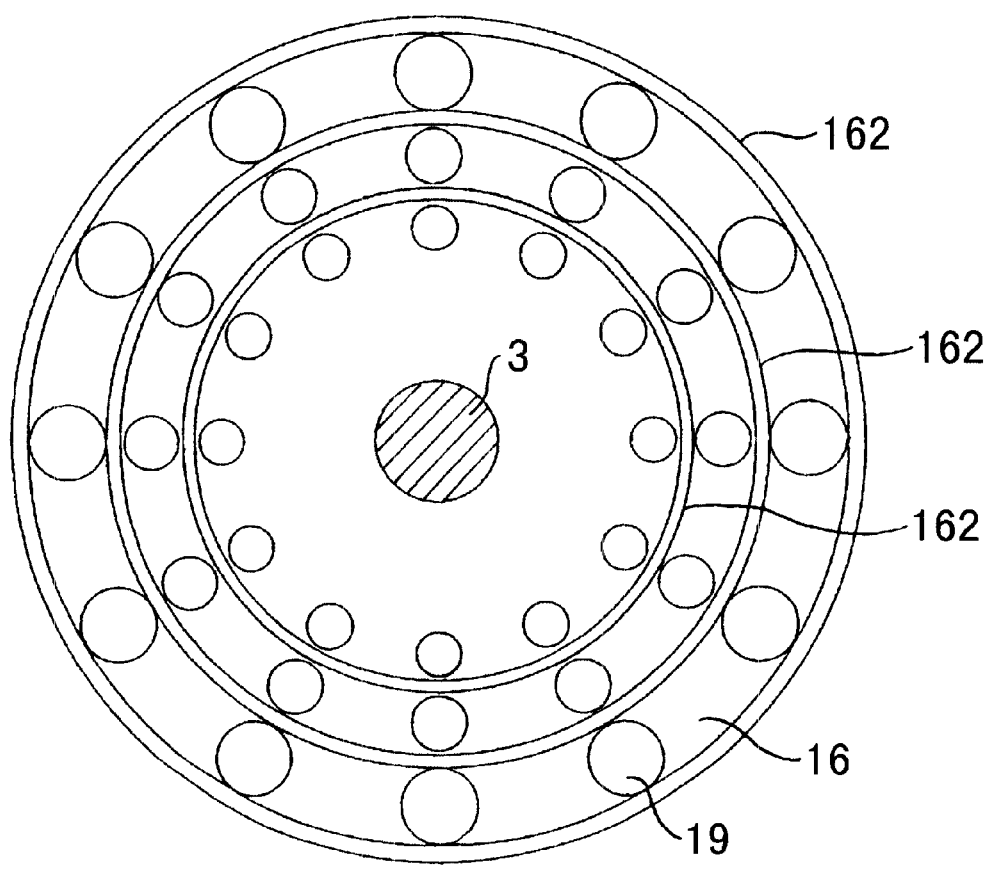
FIG. 4 is a plan view of another embodiment of the agitator used for the unit shown in FIGS. 1 and 2.

The other embodiment of the circular disc 16 is shown in FIG. 4, in which a plurality of annular vanes 162 are secured onto at least one of its upper and lower surfaces. The annular vanes 162 have different diameters and arranged concentrically around the rotary shaft 3. As the circular discs 16 rotate, the mixed solution is compressed against the inner wall of each annular vane 162 on the side remote from the center of the disc to promote its pressure rise. Shearing of the fine bubbles generated by cavitation is also reinforced.

Figure 5:
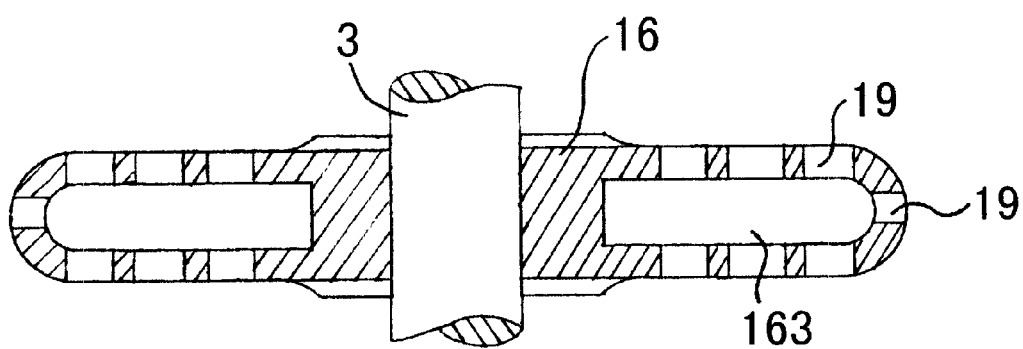
FIG. 5 is a sectional side view of the other embodiment of the agitator used for the unit shown in FIGS. 1 and 2.

The other embodiment of the circular disc 16 is shown in FIG. 5, in which the circular disc 16 has a hollow construction. More specifically, the circular disc 16 is internally provided an annular chamber 163 formed around the center thereof, which communicates with outside via holes 19. As the disc 16 rotates at a high speed, the mixed solution outside the disc flows into the annular chamber 163 and strongly compressed against inner wall on a side remote from the center of the disc to promote rise in pressure.

Figure 6:
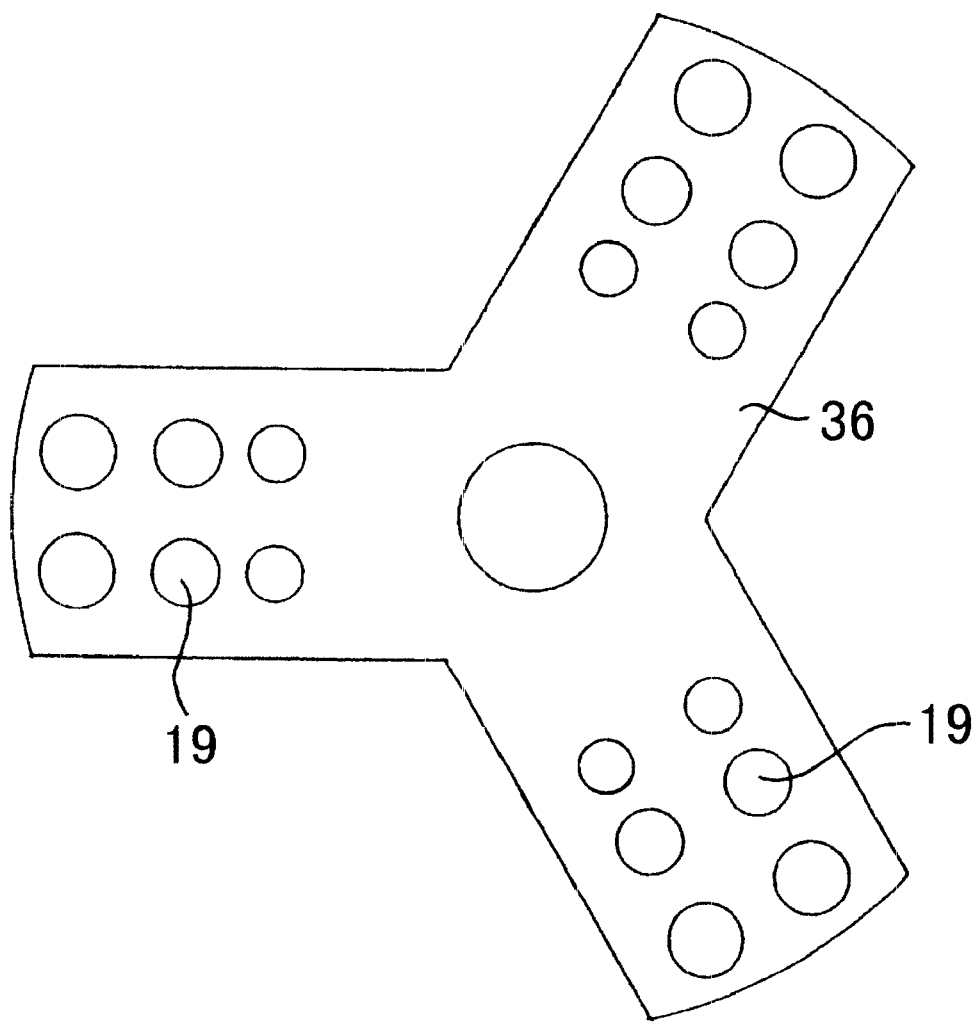
FIG. 6 is a plan view of a further embodiment of the agitator used for the unit shown in FIGS. 1 and 2.
Figure 7:
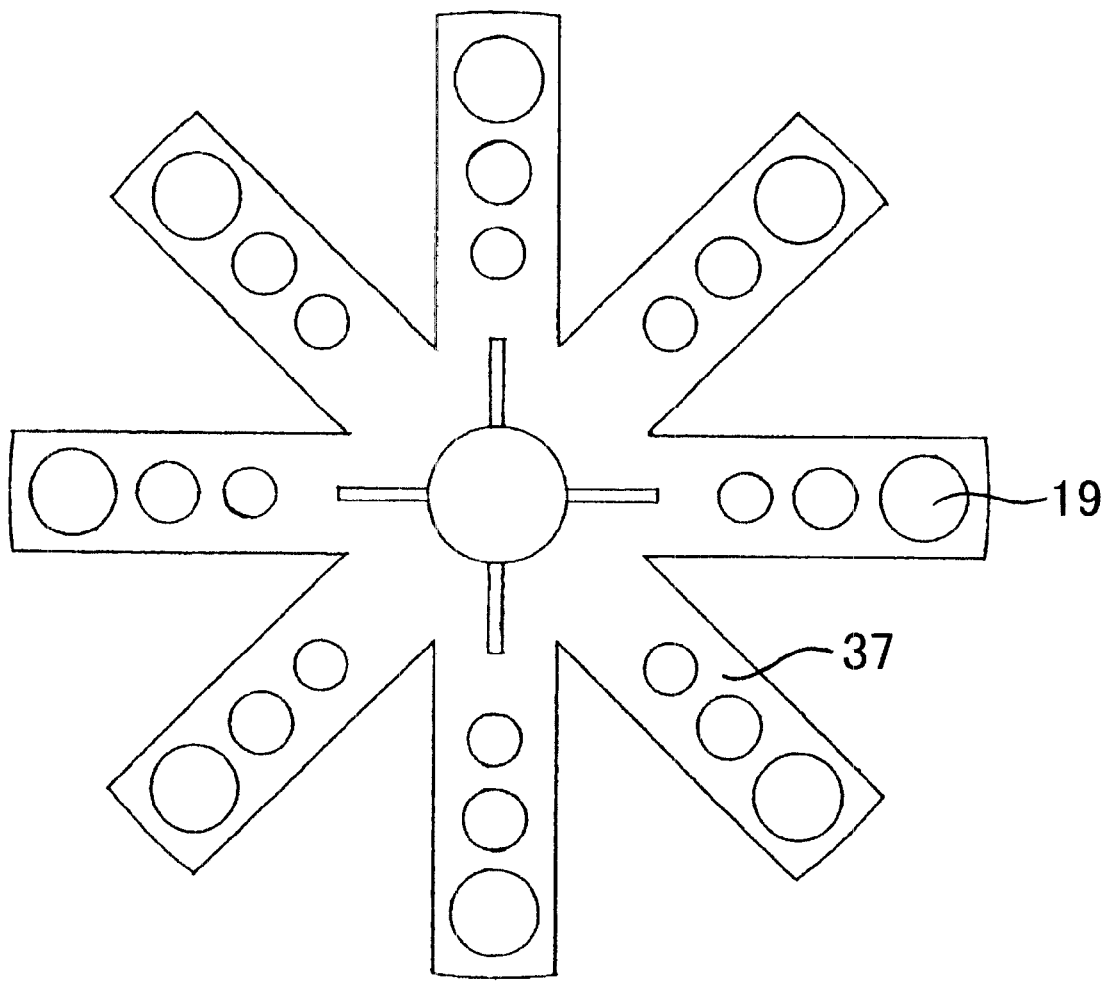
FIG. 7 is a plan view of a still other embodiment of the agitator used for the unit shown in FIGS. 1 and 2.

Although circular discs are used for the agitator in the foregoing embodiments of the present invention, various different types of agitators are usable for the present invention. FIG. 6 shows a three-branched disc 36 whereas FIG. 7 shows an eight-branched disc 37. Since the disc as the agitator is subjected to high speed rotation, the shapes and the arrangement of the branches need to be designed carefully so as to assure good dynamic balance during rotation.

As the discs rotate at a high speed, the branches strongly agitate the mixed solution within the agitation chamber 10 for increased pressure rise and, concurrently, furiously destroy the fine bubbles by shearing effect for promoted liberation of free radicals.

Figure 8:
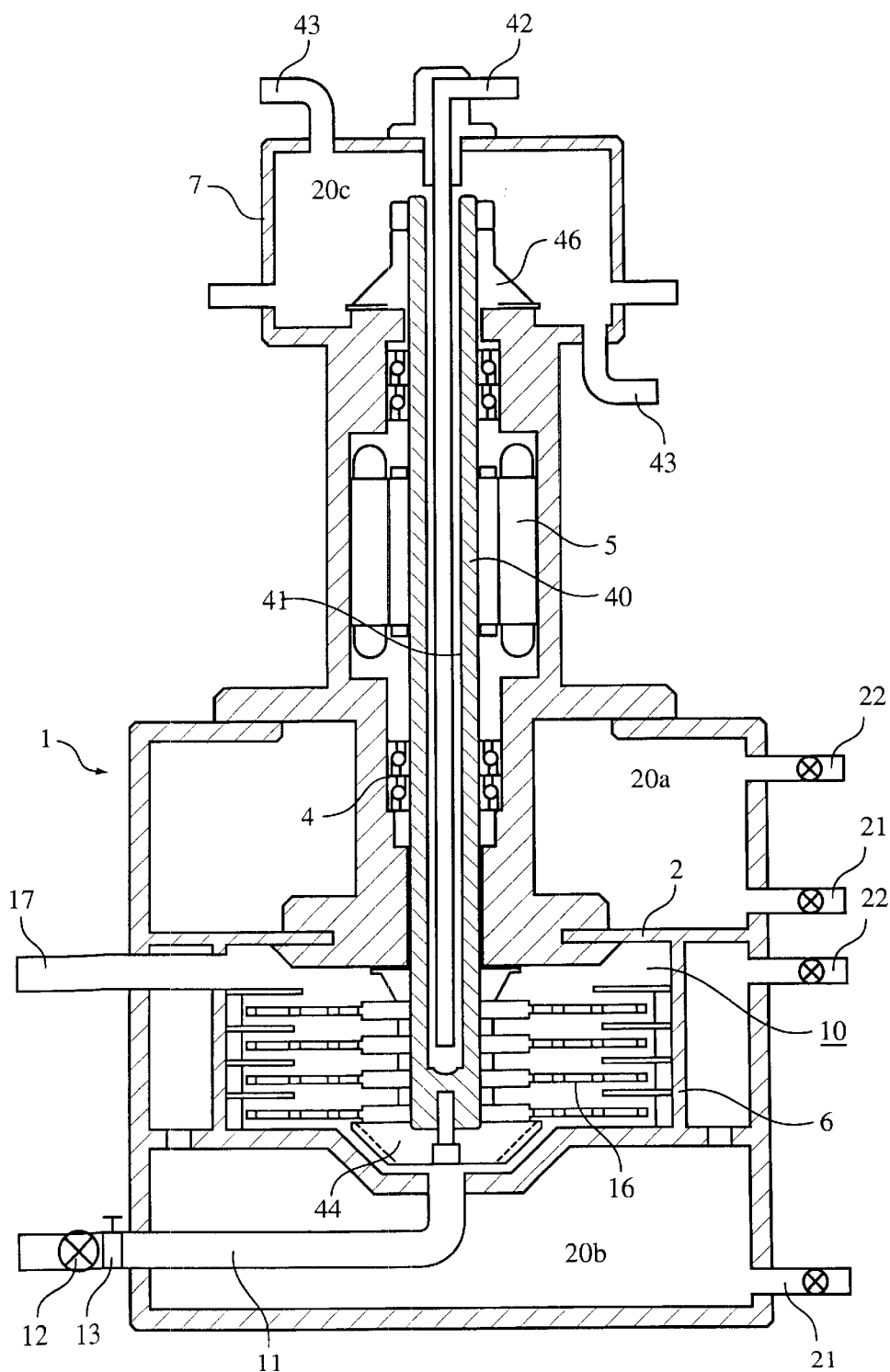
FIG. 8 is a sectional side view of another embodiment of the unit for processing a contaminated liquid in accordance with the present invention.

Another embodiment of the unit for processing contaminated liquid in accordance with the present invention is shown in FIG. 8, which provides increased cooling effect of the agitation chamber. Parts substantially same as those in the embodiment show in FIG. 1 are indicated with same reference numerals.

A processing unit 1 is divided by a horizontal partition 2 into upper and lower cooling chambers 20a, 20b. Like the embodiment in FIG. 1, the cooling chambers are associated with supply and exhaust conduits 21, 22 of cooling water. The two cooling chambers may communicate each other.

A hollow cylindrical case 6 extends into the lower cooling chamber 20b to internally define an agitation chamber 10. This agitation chamber 10 is mostly embraced by the lower cooling chamber 20b for increased cooling effect. A supply conduit 11 of mixed solution opens in the bottom section of the agitation chamber 10 while an exhaust conduit 17 of processed solution opens near the top end of the agitation chamber 10.

A bearing case 4 secured to the processing unit 1 rotatably holds a rotary shaft 40 projecting centrally into the agitation chamber 10. The rotary shaft 40 has a hollow construction and provided with an axial hole 41 opening at the upper end. The rotary shaft 40 is connected in operation to a drive motor 5 secured atop the processing unit 1.

Figure 9:
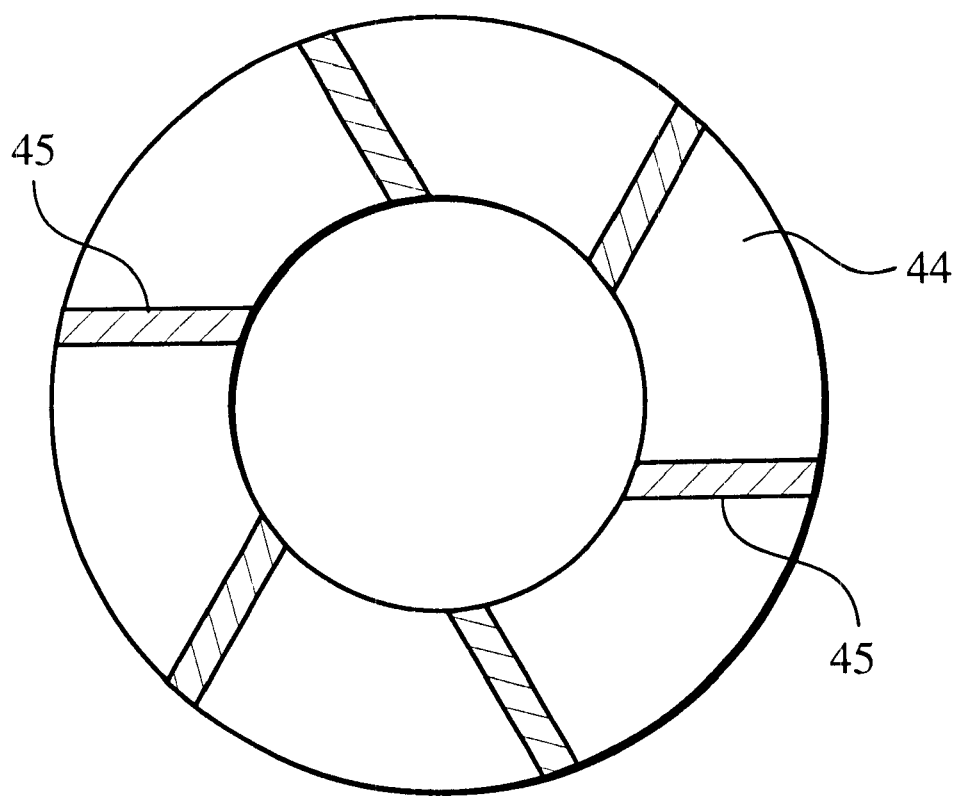
FIG. 9 is a plan view of the hood usable for said unit.

In the agitation chamber 10, the lower section of the rotary shaft 40 holds circular discs 16 in an arrangement same as that in the embodiment shown in FIG. 1. The bottom end of the rotary shaft 40 securely holds a conical hood 44 which converges downwards. As shown in FIG. 9, the inner surface of this hood 44 is provided with a plurality of vanes 45 which are somewhat biased in arrangement from the radial direction of the hood 44.

A supplementary cooling chamber 20c is defied by a hollow case 7 whilst surrounding the top end of the rotary shaft 40. Within the cooling chamber 20c, the top end of the rotary shaft 40 securely holds a conical hood 46 which converges upwards. A supply conduit 42 of cooling water connected to a given supply source (not shown) extends downwards through the axial hole 41 in the rotary shaft 40 and opens at the bottom end into the axial hole 41. The cooling chamber 20c is associated with one or more exhaust conduit 43 of the cooling water.

In operation, cooling water charged into the cooling chambers 20a, 20b is discharged outside the system via the exhaust conduits 22 while cooling the agitation chamber 10 and the bearing case 4. Cooling water introduced into the axial hole 41 of the rotary shaft 40 flows upwards while cooling the rotary shaft 40. At the top end of the axial hole 41, it overflows into the supplementary cooling chamber 20c and is spattered radially outwards so as to be discharged outside the system through the exhaust conduit 43. The mode of flow of the mixed solution charged into the agitation chamber is substantially same as that in the embodiment shown in FIG. 1.

Figure 10:
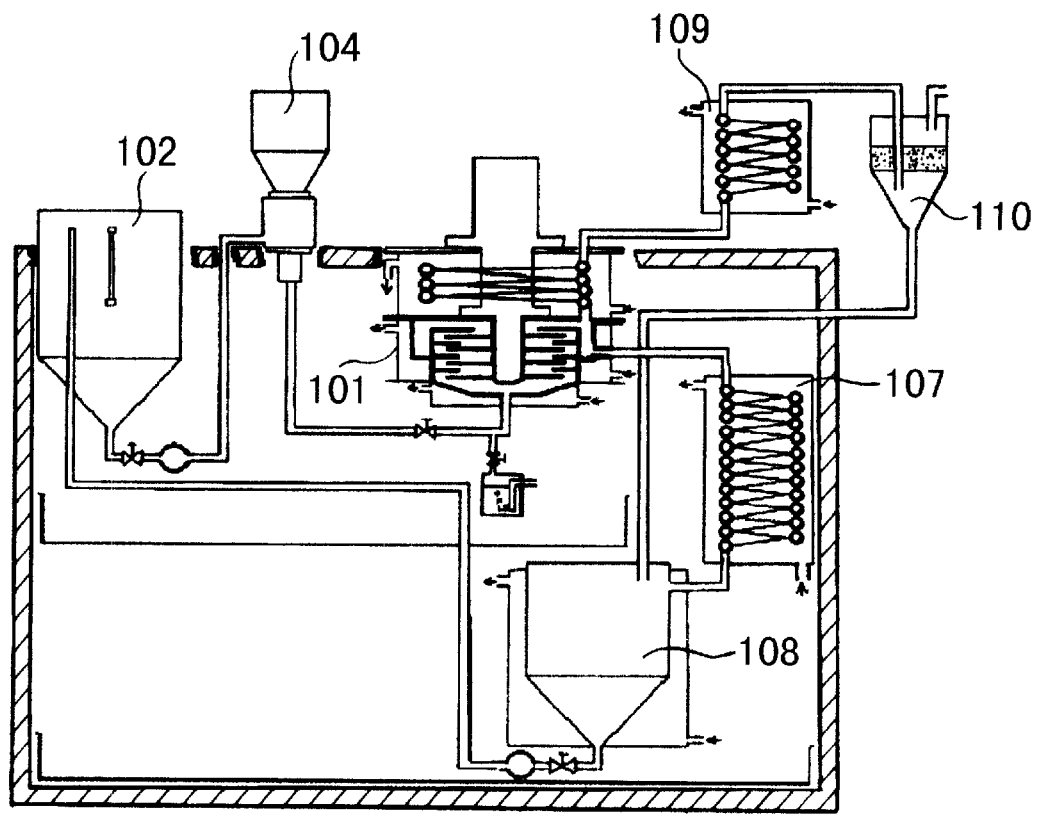
FIG. 10 is a schematic side view of one example of a plant incorporating the unit of the present invention.

One example of a batch-type plant incorporating the processing unit of the present invention is shown in FIG. 10. The processing unit 101 is connected on the upstream side to a reservoir tank 102 of contaminated liquid via a mixing unit 104 for addition of reactant. On the downstream side, the processing unit 101 is connected to a reservoir tank 108 of processed solution via a cooling unit 107. The processing unit 101 is further connected to an activated carbon unit 110 via a cooling unit 109.

In accordance with the preset invention, successful creation of the field of super critical conditions enables continuous processing of contaminated liquid under normal temperature and pressure conditions. It is not required for the processing to utilize burning steps and to employ advanced preparation of high temperature and/or pressure conditions. The system accompanies no production of undesirable arisings, harmful ashes thereby assuring safe operation of the system.

Possibility of continuous processing at high operation efficiency allows large scale processing at a small plant, thereby reducing the operation and installation costs greatly. Since the system is an entirely closed construction, it produces substantially no harmful substances to be discharged outside the system.

What is claimed is:

1. A method for processing contaminated liquid comprising:
   providing an agitation chamber incorporating two or more horizontal perforated agitators which are in a vertically spaced superposed arrangement,
   providing mixed solution of contaminated liquid containing a harmful compound and a reactant capable of coupling to free radicals liberated from said compound,
   charging said mixed solution into said agitation chamber,
   driving said agitators for rotation at a speed in a range from 10,000 to 18,000 rpm, and
   discharging processed solution from said agitation chamber.

2. A method as claimed in claim 1 in which
   said mixed solution is charged into the lower section of said agitation chamber and said processed solution is discharged from the upper section of said agitation chamber.

3. A method as claimed in claim 1 in which
   said agitation chamber is cooled during processing.

4. A unit for processing contaminated liquid comprising:
   an agitation chamber of a substantially closed construction, two or more horizontal perforated agitators incorporated in said agitation chamber in a vertically spaced superposed arrangement,
   means for charging into said agitation chamber mixed solution of a contaminated liquid containing harmful compound and a reactant capable of coupling to free radicals liberated from said compound,
   means for driving said agitators for rotation at a speed in a range from 10,000 to 18,000 rpm, and
   means for discharging processed solution from said agitation chamber.

5. A unit as claimed in claim 4 in which
   a plurality of baffle pieces are secured to the side wall of said agitation chamber near top and bottom ends of said agitation chamber with distribution along the circumferential direction of said agitators, and
   each said baffle piece is of a triangular configuration projecting towards the center of said agitation chamber.

6. A unit as claimed in claim 4 in which
   a plurality of deflector rings are secured to the side wall of said agitation chamber at positions between vertically adjacent agitators, and
   the inner edge of each deflector ring extends towards the center of said agitation chamber beyond the outer edge of an associated agitators.

7. A unit as claimed in claim 4 in which
   each said agitator is given in the form of a circular disc.

8. A unit as claimed in claim 4 in which
   each said agitator is given in the form of a branched disc.

9. A unit as claimed in claim 4 in which
   each said agitator has a hollow construction, and
   its inner annular chamber communicates with outside via holes.

10. A unit as claimed in claim 4 further comprising means for cooling said agitation chamber during processing.

11. A unit as claimed in claim 10 in which
    said cooling means includes a cooling chamber arranged above said agitation chamber.

12. A unit as claimed in claim 4 in which
    said driving means include a rotary shaft extending vertically through the center of said agitation chamber and a drive motor arranged outside the agitation chamber in connection to said rotary shaft.

13. A unit as claimed in claim 12 in which further comprising means for cooling said agitation chamber during processing.

14. A unit as claimed in claim 13 in which
    said cooling means includes a cooling chamber embracing said agitation chamber and a supplementary cooling chamber embracing the top end section of said rotary shaft.

15. A unit as claimed in claim 14 in which
    said rotary shaft has an axial hole opening at the top into said supplementary cooling chamber, and
    a supply conduit of cooling water extends through said axial hole of said rotary shaft whilst opening near the bottom closed end of said axial hole.

* * * * *